Patented Mar. 2, 1954

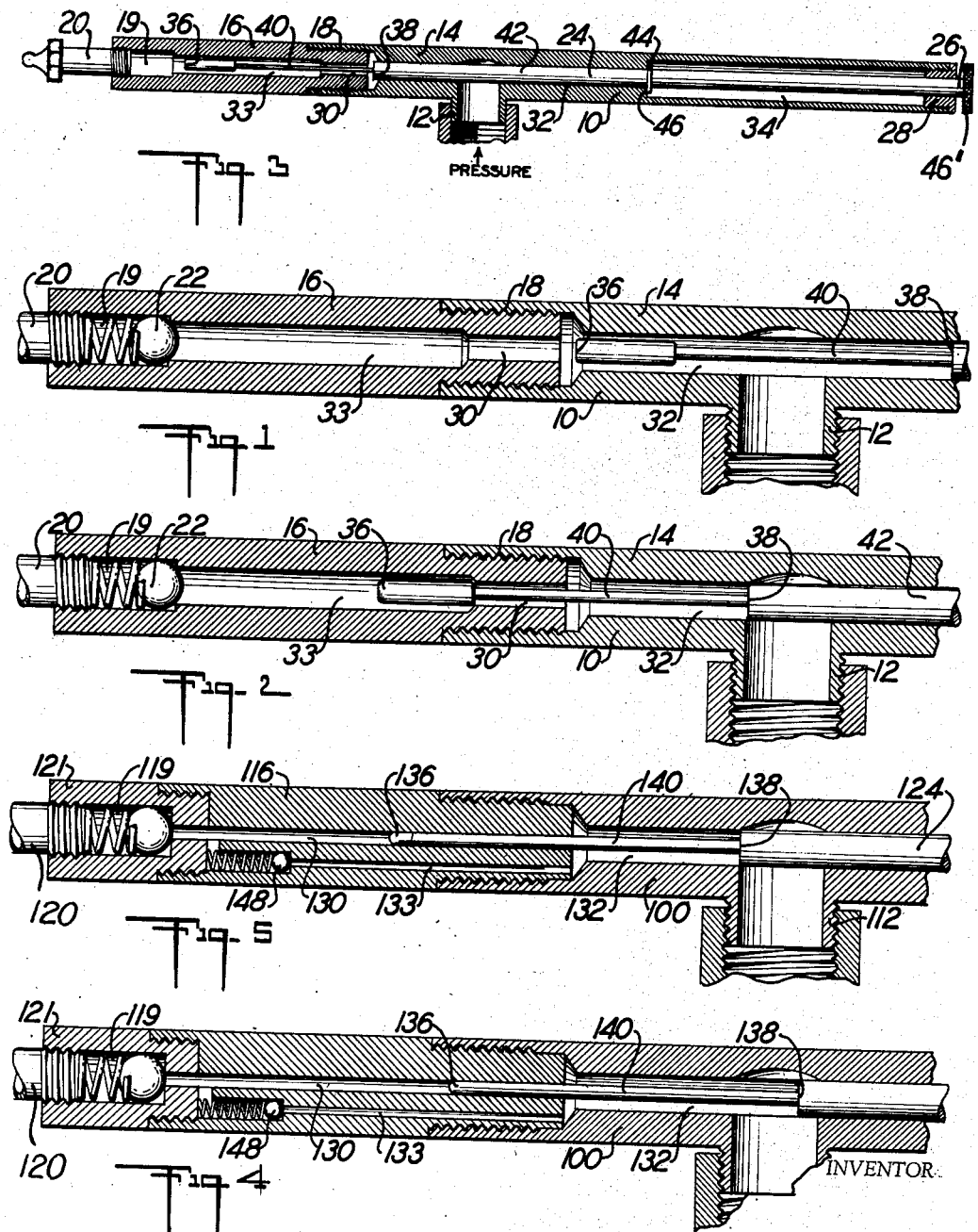

2,670,877

UNITED STATES PATENT OFFICE 2,670,877

GREASE GUN

Wilson J. Logue, Anthony, Kans.

Application March 26, 1951, Serial No. 217,424

11 Claims. (Cl. 222—124)

This invention relates to a pump particularly adapted to dispense lubricating greases.

It is an object of the present invention to provide a grease dispensing pump capable of dispensing a small amount of grease at extremely high pressure and a relatively larger amount of grease at a relatively lower pressure in a single stroke.

It is also an object of this invention to provide a grease gun capable of dispensing grease at extremely high pressure by use of a series of repeated short strokes of a hand operated plunger.

It is also an object of this invention to provide a grease gun having a single plunger which is adapted to dispense grease at high pressure and low pressure in a single stroke.

It is also an object of this invention to provide a grease gun having means for breaking a tight fitting with a short high pressure stroke and subsequently dispensing a large volume of grease at a lower pressure in the same stroke.

It is also an object of this invention to provide a grease gun having both high and low pressure dispensing capabilities and yet utilizing a minimum number of parts. Other objects will become apparent from the detailed description and drawings.

The objects of this invention are accomplished by the provision of a casing which is provided with a small bore forward of a large bore, a small piston for said small bore spaced forwardly of a larger piston for said larger bore, said pistons being positioned within said casing and operatively connected for reciprocation, a grease inlet for said casing communicating with said larger bore, said pistons being so associated with said inlet that the smaller piston is pressure feeding in its bore before the larger piston closes the inlet and thereafter said larger piston pressure feeds, and means for bypassing said smaller piston with the pressure load created by said larger piston.

In a more specific embodiment of my invention, a single plunger carries both of the pistons, with the smaller piston spaced forward of the larger piston by a connecting member which is smaller than either of the pistons in its cross sectional dimensions. In this embodiment of the invention the bypass means comprises a bore larger than the small bore and positioned forward of the small bore.

In another form of this invention both pistons are carried by a single plunger and the small piston is spaced forward of the larger piston by a connecting member which may have the same cross-sectional dimensions as the small piston. In this form of the invention the bypass means comprises a relatively small bore extending alongside the previously defined small bore and communicating with both the large bore and the outlet.

In pumps of the so-called "grease gun" type attempts have been made to develop a device in which both high pressure and low pressure grease dispensing can be accomplished. In some forms of the prior art of grease guns, a plunger is provided with a reduced diameter at the forward end and is adapted to fit into a reduced section of the casing, whereby the last part of a forward motion of the plunger will develop a high pressure in the low diameter casing with the reduced plunger and a reverse grease bypass is provided leading to a supply for the gun. Other devices have provided separate plungers, one moving in one direction and another moving in a direction at an angle thereto. In such casings, it is necessary to have two completely separate bores and separate plungers of different sizes.

It has been found that grease guns of the prior art are unsatisfactory in that they require a relatively large number of parts with a resulting high cost. It has also been found that the prior art devices are unsatisfactory because they generally have a low pressure stroke followed by a high pressure stroke.

It has now been discovered that by the novel arrangement of the present invention a high pressure stage can be provided ahead of a low pressure stage. This enables one to place a grease gun on a fitting and break loose any stuck elements of the fitting at the beginning of the forward stroke of the plunger and by a continued forward motion of the plunger apply a high volume of grease at a lower pressure. The advantages of such a device are particularly notable in the increased speed of lubrication and in the ease of the operation of the device.

By the particular arrangement of the elements of this invention, it is possible to use a single integral plunger positioned within a single straight casing provided with a side inlet. Such an arrangement is efficient, susceptible of ready manufacture and relatively inexpensive.

Referring to the drawings:

Fig. 1 is a partial cross section and a partial elevation of one form of the present invention with the plunger in its rearmost starting position.

Figure 2 is a partial cross section and partial elevation of the grease gun of the same form of the present invention with the plunger at the position where the high pressure stage ends and the low pressure stage begins.

Fig. 3 is a partial cross section and partial elevation of that form of the grease gun of the present invention shown in Fig. 1, with the plunger at the end of a stroke.

Fig. 4 is a partial cross section and a partial elevation of another form of the invention with the plunger positioned at the middle of the high pressure stage.

Fig. 5 is a partial cross section and partial elevation of that form of the invention shown in Fig. 4 with the plunger at the position where the high pressure stage ends and the low pressure stage begins.

Having described my invention in its broadest terms, reference is made to the drawings to illustrate the specific embodiments which I have found to be most preferable.

In that form of the invention shown in Fig. 1 a casing 10 is provided with a grease inlet 12 at one side thereof. In the form as shown, the casing 10 is made up of a rear portion 14 and a forward portion 16. Of course, the casing can be made as a single element, if desired, but I have found it more practical to machine the forward element 16 separately from the rear element 14 so that the two may be assembled or disassembled by such means as the screw threads 18 in order to permit complete disassembly for ease of cleaning. The forward element 16 of the casing is provided at its forward end with an outlet 19 and a grease fitting 20 of any conventional type such as a Zerk fitting. A spring-seated ball valve 22 is provided in outlet 19 between the grease fitting 20 and a shoulder within casing 10 to prevent untimely discharge of grease. A hand operated reciprocating plunger 24 is positioned within casing 10 so that a portion 26 extends rearwardly out of the casing for manual operation. (See Fig. 3.) A bushing 28 may be screw threaded into the end of the casing to provide a smooth bearing surface for the plunger.

Casing 10 is preferably in the form of a cylindrical body member of generally uniform outside diameter and is provided with internal communicating concentric bores of varying sizes. A small bore 30 is positioned about half way between inlet 12 and outlet 19. This small bore is preferably positioned at the rear end of the forward casing element 16 as a matter of convenience in manufacture and assembly. A larger bore 32 extends through a part of casing 10 through casing element 14. A bypass bore 33 of substantially the same diameter as bore 32 extends between outlet 19 and bore 30. While it is not entirely necessary that bore 33 be the same diameter as bore 32, it is generally preferred to have bores 32 and 33 of a uniform cross section throughout. A third and larger bore 34 is provided at the rear of the casing 10 for purposes of convenience in the manipulation of the plunger 24. The diameter of the bore 34 is relatively unimportant, but in the preferred form of the invention, it is considerably larger than either of bores 30 or 32.

The plunger 24 is preferably metallic and made up of integral concentric cylindrical members including a forward piston 36, a second larger piston 38, a connecting spacer rod 40 and a rod portion 42. The forward piston 36 fits closely in bore 30 as the plunger is moved from its rear position to its forward position to define a low-volume high-pressure follower or plunger. Piston 38 is the forward portion of rod 42, and is closely fitted into bore 32. In this connection, it is to be noted that rod 42 acts as a valve to close the grease inlet 12 when piston 38 passes beyond it. Connecting spacer rod 40 is of considerably smaller diameter than either piston 36 or piston 38 so that grease may flow through bore 30 and bypass piston 36 after piston 36 has entered bypass bore 33 and grease is moving in response to piston 38 only.

It is significant that piston 38 is inoperative for all practical purposes before it passes inlet 12 because trapped grease moves backwardly through the inlet, and after piston 38 passes inlet 12, it becomes independently operative to the exclusion of piston 36.

Plunger 24 is also provided with a stop ring 44 which is integrally attached thereto. Stop ring 44 moves freely in bore 34 and engages either bushing 28 or shoulders 46 to halt the rearward and forward motion of the plunger.

In this form of the invention, an important consideration is the length of the connecting spacer rod in relation to the distance between the front of inlet 12 and the front of bore 30. This distance should be so proportioned that as piston 36 clears bore 30, piston 38 will close inlet 12, thereby making an immediate transition from the high pressure stage to the low pressure stage. If this distance is too short, the trapped grease between the plungers will form a lock which will prevent any further forward motion of the plunger. If this distance is too great, the device will still operate, but there will be some lost motion, and the grease gun will be burdened with the unnecessary length.

At the end of plunger 24 a handle 46' is provided for a hand operated pump. Of course, a machine operated or lever operated device is within the skill of the art and could well be adapted to the present invention. A grease supply, indicated by the word "Pressure," is provided to furnish a ready supply of grease under a light pressure. It is, of course, within the skill of the art to provide any suitable means of supplying grease under sufficient pressure to charge the device when plunger 24 is in the rearmost position.

The operation of that form of the invention shown in Figs. 1–3 will be obvious with reference to the figures showing the stages of operation. In Fig. 1, plunger 24 is in its rearmost position and grease to be dispensed is free to flow into bores 30 and 32 and around piston 36 into bore 33. On forward motion of the plunger, piston 36 moves into bore 30 and because of its small cross sectional diameter exerts a very high pressure movement of grease past valve 22 and into fitting 20. This first and high pressure stage of this forward motion of plunger 24 is capable of breaking loose stubborn, stuck grease fittings which are frequently found in occasionally lubricated machines. Fig. 2 shows the piston 36 as it clears bore 30 and piston 38 as it closes inlet 12, which is the exact point when piston 36 becomes inoperative and piston 38 becomes operative to begin the second and low pressure stage. During the remainder of the forward movement of the plunger 24 impetus is given the grease from piston 38 only and the grease flows through bore 30, around the spacer rod 40, around piston 36, through bypass bore 33 and into the grease fitting at a lower pressure, but at a relatively high volume due to the larger cross section of piston 38. At the end of the stroke, plunger 24 is withdrawn and the gun is recharged, as shown in Fig. 1.

It is particularly significant that the pistons 36 and 38 are so associated with inlet 12 that the smaller piston 36 is pressure feeding in its bore 30 before the larger piston 38 closes the inlet 12 and thereafter the larger piston 38 pressure-feeds; and that when the larger piston 38 is pressure feeding, trapped grease bypasses piston 36 in bypass bore 33.

In that form of the invention shown in Figs. 4 and 5, a casing 100 is provided with a large bore 132, a small bore 130, an inlet 112, and an outlet 119. Elements of the device shown in Figs. 4 and 5 are given numerical designations each higher by 100 than corresponding elements of that from the invention shown in Figs. 1–3. The small bore 130 extends from the foremost part of the casing rearwardly to a point forward of the inlet 112, which in this instance is preferably the entire length of casing element 116. The distance between the inlet 112 and small bore 130 determines the length of the high pressure stroke as will be more fully explained hereinafter. A small bypass bore 133 extends alongside small bore 130, and is provided with a spring-seated ball-check valve 148 to allow movement of grease in a forward direction only. Bore 133 communicates with outlet 119 and large bore 132 to provide a separate outlet for the high-volume low-pressure grease.

The plunger 124 is provided with a forward piston 136 and a rear piston 138 which mates with bores 130 and 132 respectively. In this form of the invention, the spacer rod 140 is preferably of the same cross sectional diameter as the piston 136. Casing 110 has a third element 121 for convenience in mounting valve 148. In all other structural respects the two modifications may be regarded as the same.

The operation of the modification as shown in Fig. 4 is as follows: In the rearmost position of plunger 124, grease is charged into bores 130, 132 and 133 from any convenient source of supply through inlet 112. On forward motion of plunger 124 piston 136 enters bore 130 and grease in bore 130 is discharged at a high pressure (Fig. 4). Check valve 148 prevents reverse motion of the grease trapped at the outlet 119. Trapped grease within the larger bore 132 escapes back through inlet 112 while small piston 136 is operative. As soon as large piston 138 passes inlet 112, grease trapped within bore 132 is forced through bore 133 and into outlet 120. At that point, smaller piston 136 is completely inoperative as a "high pressure" unit because the force applied to plunger 124 is distributed over the area of both pistons to reduce the pressure and increase the volume of dispensed material. Thus the distance of inlet 112 from the bore 130 determines the length of the high pressure stage. On completion of its forward motion, the plunger is retracted for recharging in the same manner as the form shown in Fig. 1.

It is again significant that the pistons 136 and 138 are so associated with inlet 112 that small piston 136 is pressure-feeding in its bore 130 before the larger piston 138 closes inlet 112 and thereafter larger piston 138 is pressure-feeding. When larger piston 138 is pressure-feeding, grease bypasses smaller piston 136 through bore 133, which is positioned to one side of and parallel with small bore 130.

In the claims and specification, the word bore is used in a general sense and not in a limiting sense in that it is immaterial how the passages are formed within the casing.

Thus, it will be seen that the present invention contemplates a two stage grease gun wherein a high pressure dispensing stage precedes a low pressure dispensing stage. It will further be seen that the present invention provides a novel pressure grease gun having a casing with a large bore and a small bore surrounding and closely fitting over a plunger having a small piston and a large piston in such a manner that the small piston is first operative and the large piston is later operative.

I claim:

1. A pressure grease gun comprising a casing provided with a large bore and with a smaller bore forwardly thereof, a large piston working in said large bore, a small piston working in said small bore, a spacer rod of substantial length operatively connecting said large and small pistons for spacing them apart and for causing them to reciprocate together, said spacer rod serving to position the small piston at the entrance of said smaller bore while the larger piston is spaced a substantial distance from the entrance to said large bore, said casing being provided with a grease inlet for admitting grease into the zone between the said large and small pistons, whereby the small piston substantially completes its high pressure, compression stroke before the large piston enters the large bore to begin its low pressure compression stroke, and means for bypassing low pressure grease from the large piston around the small piston after the small piston has completed its high pressure stroke.

2. The pressure grease gun as claimed in claim 1 wherein said bypass means is a relatively large bore positioned forward of said small bore.

3. The pressure grease gun as defined in claim 2 wherein a single plunger carries both of said pistons and said smaller piston is spaced forward of said larger piston by a connecting member having smaller cross sectional dimensions than either of said pistons.

4. The pressure grease gun as claimed in claim 3 wherein the distance between said inlet and the most forward portion of said small bore is substantially equal to the length of said connecting member.

5. The pressure grease gun as claimed in claim 1 wherein said bypass means is a third relatively small bore extending alongside said first small bore.

6. The pressure grease gun as claimed in claim 5 wherein the distance between said inlet and the rear edge of said first small bore is less than half the length of said connecting member.

7. A two-stage grease gun for dispensing a lubricating grease at relatively high and low pressures comprising a generally cylindrical hollow casing, an outlet at the forward end of said casing provided with a grease fitting and a valve for preventing untimely discharge, said casing being provided with a small bore and a large bore, said small bore being relatively short in a position intermediate the ends of the casing, an inlet communicating with said large bore, the distance between said inlet and the forward end of said small bore being substantially equal to the distance between said small bore and said outlet, means for supplying grease through said inlet at a relatively low pressure, a cylindrical rod positioned within the rear end of said large bore, the rear end of said cylindrical rod being provided with means for manual reciprocation and the forward end of said rod carrying a first and second piston, said first piston operatively mating with said larger bore, said second piston operatively mating with said smaller bore, a connecting member rigidly and integrally connecting said first and second pistons, and spacing of said second piston forward of said first piston, said connecting member having cross sectional dimensions substantially smaller than either of said bores, said connecting member having an overall length equal to at least the distance between the forward end of the small bore and the forward portion of said inlet whereby on forward motion of the pistons said second piston moves through the said small bore to complete a short high pressure stroke and said first piston immediately thereafter closes said inlet to begin lower-pressure greater-volume stroke.

8. A two-stage grease gun for dispensing a lubricating grease at relatively high and low pressures, comprising a generally cylindrical hollow casing, an outlet at the forward end of said casing provided with a grease fitting and a valve for preventing untimely discharge, said casing being provided with a small bore and a larger bore, said small bore extending from a point adjacent the outlet rearwardly, an inlet in said casing positioned rearwardly of said bore and in communication with said large bore, the distance between said inlet and the rear of said small bore being relatively short, means for supplying grease to said inlet at a relatively low pressure, a cylindrical rod positioned within the rear end of said large bore, the rear end of said cylindrical rod being provided with means for manual reciprocation, and the forward end of said rod forming a first and second piston, said first piston operatively mating with said larger bore, said second piston positioned operatively mating with said small bore, a connecting member rigidly and integrally connecting said first and second pistons and spacing said second piston forward of said first piston, a bypass bore positioned alongside said small bore and communicating with said larger bore and said outlet, a check valve in said bypass bore for preventing backward movement of grease, whereby on forward motion of said pistons grease moves first at high pressure in response to the thrust of said forward piston and then at low-pressure and high-volume in response to the thrust of said larger piston.

9. A casing adapted for use in a two-stage pressure grease gun wherein a plunger carrying a pair of spaced pistons is reciprocated so that a first smaller piston first operates at high pressure and a second larger piston then operates at a lower pressure, comprising a hollow, generally cylindrical member provided with an outlet at the forward end thereof, a relatively short portion of said member intermediate its ends being provided with a relatively small bore for receiving said small piston in operative relationship, a second larger bore extending rearwardly of said first bore for receiving said larger piston in operative relationship, a third bore extending forwardly from said small bore, said third bore being larger than said small bore to form a bypass for grease around the small piston in one stage of operation, and an inlet positioned in said casing in communication with the second bore, said inlet and said outlet being substantially equidistant from the forward edge of said small bore.

10. A pressure grease gun including a casing provided with bores of different sizes including a smallest relatively short bore positioned intermediate the ends of the casing, comprising a plunger member adapted to be operatively mounted within the casing, means at one end of said member for imparting reciprocation thereto, the other end of said member being provided with a first forward piston and a second rear piston, said first piston being adapted to fit operatively in the smallest bore of the casing, said second larger piston being spaced rearwardly from said first piston and adapted to fit operatively in a larger bore of the casing, said plunger being provided with a connecting member extending between said first piston and said second piston for causing them to reciprocate together, said connecting member being of substantially smaller cross sectional dimension than either of said pistons.

11. A casing adapted for use in a two-stage pressure grease gun wherein a plunger carrying a pair of spaced pistons is reciprocated so that a first smaller piston first operates at a high pressure and a second larger piston then operates at a lower pressure, comprising a hollow, generally cylindrical member, provided with an outlet at the forward end thereof, a first relatively small bore communicating with said outlet, a second larger bore positioned rearwardly of said first bore and concentric therewith, a third relatively small bore positioned alongside said first small bore and in communication with said outlet and said second large bore, a valve in said third bore to prevent rearward motion of grease therethrough, and an inlet in said casing communicating with said second larger bore at a position rearwardly of said small bores, the distance between said inlet and said small bore being substantially less than the length of said small bores, said first small bore and said second large bore being adapted to operatively receive said first small piston and said second larger piston in respective operative relationship.

WILSON J. LOGUE.

References Cited in the file of this patent
UNITED STATES PATENTS

| Number | Name | Date |
|---|---|---|
| 1,799,492 | Adams | Apr. 7, 1931 |
| 1,869,722 | Thomas | Aug. 2, 1932 |
| 1,902,822 | Becker | Mar. 28, 1933 |
| 1,903,227 | Snodgrass | Mar. 28, 1933 |